United States Patent [19]

Mertens

[11] Patent Number: 4,895,746

[45] Date of Patent: Jan. 23, 1990

[54] STACK OF PRESSURE SENSITIVE ADHESIVE COATED SHEETS

[75] Inventor: Timothy A. Mertens, St. Paul, Minn.

[73] Assignee: Minnesota Mining and Manufacturing Company, Saint Paul, Minn.

[21] Appl. No.: 317,649

[22] Filed: Mar. 1, 1989

[51] Int. Cl.$^4$ .......... B32B 7/06

[52] U.S. Cl. .......... 428/40; 428/194; 428/202

[58] Field of Search .......... 428/40, 194, 202

[56] References Cited

U.S. PATENT DOCUMENTS

| | | | |
|---|---|---|---|
| 2,170,147 | 8/1939 | Lane | 206/56 |
| 2,248,317 | 7/1941 | Van Cleef | 206/57 |
| 2,574,152 | 11/1951 | Lewis et al. | 206/56 |
| 2,607,711 | 8/1952 | Hendricks | 117/122 |
| 3,083,393 | 4/1963 | Nappi | 15/215 |
| 3,373,457 | 3/1968 | Rouch, Jr. | 15/104 |
| 3,575,788 | 4/1971 | Funk et al. | 161/167 |
| 4,107,811 | 8/1978 | Imsande | 15/215 |
| 4,128,954 | 12/1978 | White | 40/310 |

*Primary Examiner*—Alexander S. Thomas

*Attorney, Agent, or Firm*—Donald M. Sell; Walter N. Kirn; William L. Huebsch

[57] ABSTRACT

A stack of aligned sheets, each of which sheets includes a backing, a coating of pressure sensitive adhesive on a lower surface of the backing by which the sheet is adhered to the sheet beneath it in the stack, which coating extends along and within at least 12.5 mm of all of the edges of the backing, release means providing a first adhesion zone between adjacent sheets in the stack and adjacent one of the edges of the sheet for providing a sufficiently low release force between the adhesive coating and the upper surface of the adjacent sheet in the stack to afford, when the sheet is the uppermost sheet in the stack, each initiation of peeling of the sheet from the adjacent sheet in the stack, and attachment means providing a second adhesion zone between adjacent sheets in the stack for providing a sufficiently high release force that is higher than said low release force in the first adhesion zone to firmly adhere adjacent sheets in the stack together and thereby hold the stack of sheets together during handling, while affording continued peeling away of the uppermost sheet in the stack after initiating of such peeling along the first adhesion zone.

11 Claims, 2 Drawing Sheets

STACK OF PRESSURE SENSITIVE ADHESIVE COATED SHEETS

TECHNICAL FIELD

The present invention relates to sheets, such as labels, including layers of pressure sensitive adhesive by which the sheets can be adhered to a substrate, and in particular to the manner in which the adhesive coating of such sheets is protected prior to the use of the sheets.

BACKGROUND ART

Heretofore, stacks of sheets including layers of pressure sensitive adhesive by which entire surfaces of the sheets can be adhered to a substrate (e.g., labels intended to be permanently adhered to a substrate) have typically utilized liner material separating portions of the adhesive coated surfaces of the sheets, which liner material must be separated from the sheet and disposed of after the sheet has been peeled from the stack which is both inconvenient and wasteful.

Stacks of sheets are known that include layers of pressure sensitive adhesive by which the entire surfaces of the sheets can be adhered to a substrate except for edge portions of the sheets that do not adhere to other sheets in the stack to facilitate peeling a sheet from the stack by grasping its edge portion. Such sheets are not suitable for some purposes, however, because their edge portions can not be adhered to the substrate and can be caught by objects adjacent the substrate to tear or cause unwanted peeling away of the sheet.

DISCLOSURE OF INVENTION

The present invention provides a stack of sheets including layers of pressure sensitive adhesive, such as labels, which sheets have no disposable liners for the adhesive, adhere firmly together so that the stack can be handled without separation between sheets in the stack, and yet can be easily removed from the top of the stack and have its surface firmly adhered to a substrate along all of its edges.

According to the present invention there is provided a stack of aligned sheets, each of which sheets includes a backing, a coating of pressure sensitive adhesive on a lower surface of the backing by which the sheet is adhered to the sheet beneath it in the stack, which coating extends along and within at least 12.5 mm (and preferably within at least 6 mm) of all of the edges of the backing, release means providing a first adhesion zone between adjacent sheets in the stack and adjacent one of the edges of the sheet for providing a sufficiently low release force (e.g., preferably less than 15 grams per inch) between the adhesive coating and the upper surface of the adjacent sheet in the stack to afford, when the sheet is the uppermost or lowermost sheet in the stack, easy initiation of peeling (e.g., manually or by machine) of the sheet from the adjacent sheet in the stack, and attachment means providing a second adhesion zone between adjacent sheets in the stack for providing a sufficiently high release force (e.g., preferably greater than 20 grams per inch) that is higher than said low release force in the first adhesion zone to firmly adhere adjacent sheets in the stack together and thereby hold the stack of sheets together during handling, while affording continued peeling away of the sheet in the stack after initiating of such peeling along the first adhesion zone.

Surprisingly, it has been found that when the pressure sensitive adhesive coating extends along and within at least 6 mm of all of the edges of the backing, the sheet or label adheres almost indistinguishably from a sheet or label which is fully adhesive coated.

The release means for providing the first adhesion zone, and the attachment means for providing the second adhesion zone can comprise a variety of structures including, but not limited to one or combinations of (1) providing a uniform coating of the same pressure sensitive adhesive on each of the sheets together with a coating of low adhesion backsize coating on the portion of the upper surface of each sheet only in the first adhesion zone, or providing different low adhesion backsizes on the upper surface of each sheet in the two adhesion zones, with the low adhesion backsize in the first adhesion zone having the greatest release factor; (2) making the coating of pressure sensitive adhesive on each of the sheets discontinuous in the first adhesion zone and continuous in the second adhesion zone, or discontinuous in both zones with greater discontinuities in the first adhesion zone than in the second; and/or (3) using different pressure sensitive adhesives in the two zones.

Generally, as used herein, "sheet material" means a generally flat, flexible structure. The "backing" for the sheet material may be of any flexible material such as paper or polymeric material which may be selected for its opacity, flexibility, or other inherent properties such as its ability to adhere to or release from the coating of pressure sensitive adhesive, and the backing may include two layers of such material that form a bag, envelope, or pouch. The backing may have lines of weakness formed therein along which portion of the sheet material may be separated, which lines of weakness may be provided by perforations, control-depth cuts, or other chemical or physical means to provide a weakening of the sheet along the lines. The pressure sensitive adhesive may be of an acrylic, silicone, rubber-resin, or any other suitable composition. To enhance the economy of or provide special uses for the sheet material the backing may have uncoated areas so long as the pressure sensitive adhesive coating extends along and within at least 12.5 mm (and preferably within at least 6 mm) of all of the edges of the backing, and the size of the uncoated areas do not significantly impair the ability of the layer of pressure sensitive adhesive to firmly adhere the sheet material to a substrate. Low adhesion backsize refers to a material which readily releases from a layer of pressure sensitive adhesive and includes, but is not limited to, silicones, fluorocarbons, acrylates, urethanes, chrome complexes, grafted or block siloxane hydrocarbons, and blends of these materials.

BRIEF DESCRIPTION OF DRAWING

The present invention will be further described with reference to the accompanying drawing wherein like reference numerals refer to like parts in the several views, and wherein.

DETAILED DESCRIPTION

Figure 1:
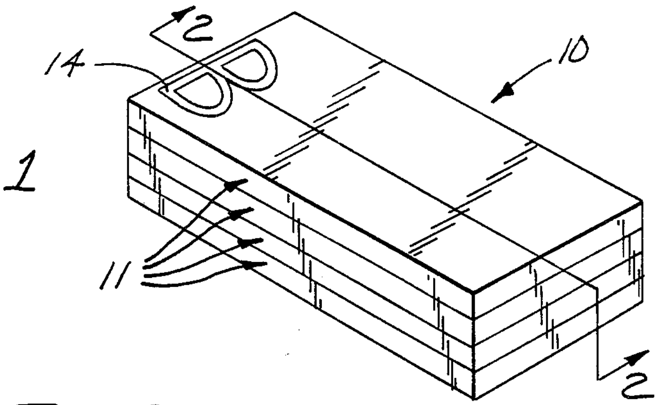
FIG. 1 is a perspective view of a first embodiment of a stack of sheets according to the present invention.
Figure 2:
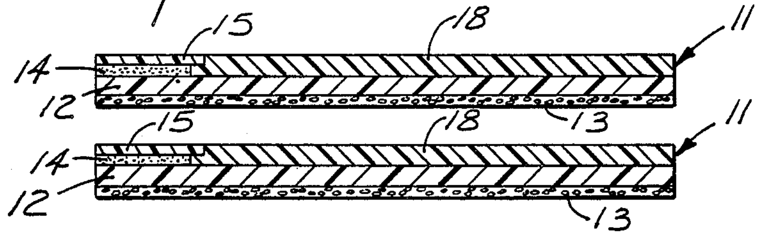
FIG. 2 is an enlarged sectional view taken approximately along line 2—2 of FIG. 1 of two sheets from the first embodiment of the stack of sheets shown in FIG. 1, but shown with the sheets separated and spaced one above the other for clarity of detail.

Referring now to FIGS. 1 and 2 of the drawing, there is shown a first embodiment of a stack 10 of aligned sheets 11 according to the present invention, each of which sheets 11 includes a backing 12 (see FIG. 2), a coating 13 of pressure sensitive adhesive on a first or lower surface of the backing 12 by which the sheet 11 is adhered to the sheet 11 beneath it in the stack 10, which coating 13 extends along and within at least 12.5 mm of all of the edges of the backing 12, and a printed image 14 on a second or top surface of the backing 12. Release means, provided by a coating 15 of a premium release low adhesion backsize along a portion of the top surface of the backing 12, provides a first adhesion zone between adjacent sheets 11 in the stack 10 and adjacent one of the edges of each sheet 11 for providing a sufficiently low release force (e.g., preferably less than 15 grams per inch) between the adhesive coating 13 and the upper surface of the adjacent sheet 11 in the stack 10 to afford, when the sheet 11 is the uppermost or lowermost sheet 11 in the stack 10, easy initiation of peeling of the sheet 11 from the adjacent sheet 11 in the stack 10; and attachment means, provided by a coating 18 of an organic low adhesion backsize along the portion of the top surface of the backing 12 not covered by the coating 15, provides a second adhesion zone between adjacent sheets 11 in the stack 10 for providing a sufficiently high release force (e.g., preferably greater than 20 grams per inch) that is higher than said low release force in the first adhesion zone to firmly adhere adjacent sheets 11 in the stack 10 together and thereby hold the stack 10 of sheets 11 together during handling, while affording continued peeling away of the sheet 11 in the stack 10 after initiating of such peeling along the first adhesion zone.

Figure 3:
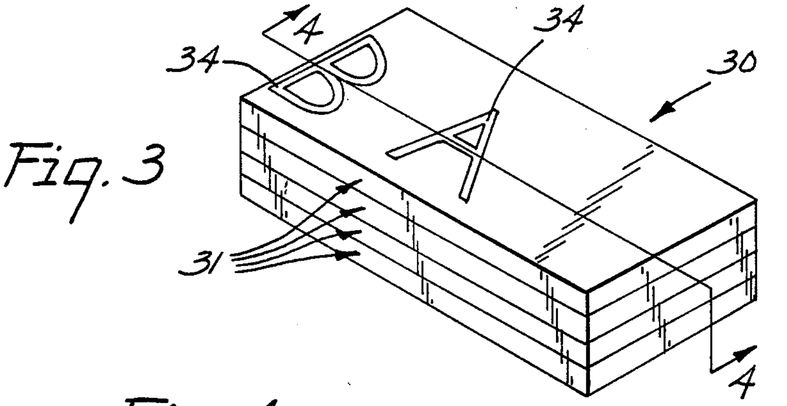
FIG. 3 is a perspective view of a second embodiment of a stack of sheets according to the present invention.
Figure 4:
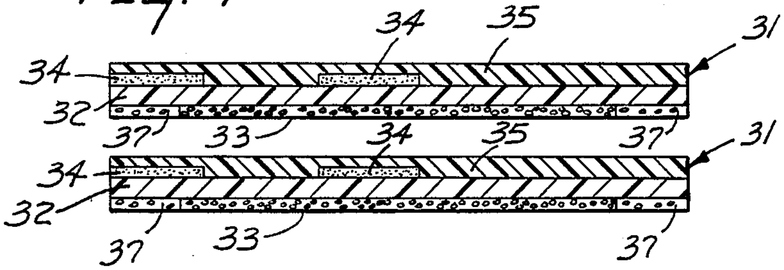
FIG. 4 is an enlarged sectional view taken approximately along line 4—4 of FIG. 3 of two sheets from the second embodiment of the stack of sheets shown in FIG. 3, but shown with the sheets separated and spaced one above the other for clarity of detail.

Referring now to FIGS. 3 and 4 of the drawing, there is shown a second embodiment of a stack 30 of aligned sheets 31 according to the present invention, each of which sheets 31 includes a backing 32 (see FIG. 4), a coating 33 of pressure sensitive adhesive on a first or lower surface of the backing 32 by which the sheet 31 is adhered to the sheet 31 beneath it in the stack 30, which coating 33 extends along and within at least 12.5 mm of all of the edges of the backing 32, a printed image 34 on a second or top surface of the backing 32, and a coating 35 of a premium release low adhesion backsize along the entire top surface of the backing 32. Release means, provided by the coating 33 of pressure sensitive adhesive having a rectangular frame like part 37 of low peel pressure sensitive adhesive adjacent the edges of the sheet 31, provides a first adhesion zone between adjacent sheets 31 in the stack 30 and adjacent all of the edges of each sheet 31 for providing a sufficiently low release force (e.g., preferably less than 15 grams per inch) between the adhesive coating 33 and the upper surface of the adjacent sheet 31 in the stack 30 to afford, when the sheet 31 is the uppermost or uppermost sheet 31 in the stack 30, easy initiation of peeling of the sheet 31 from the adjacent sheet 31 in the stack 30; and attachment means, provided by the coating 33 of pressure sensitive adhesive having a rectangular part 38 of a high peel pressure sensitive adhesive within the frame like part 37 of low peel pressure sensitive adhesive, provides a second adhesion zone between adjacent sheets 31 in the stack 30 for providing a sufficiently high release force (e.g., preferably greater than 20 grams per inch) that is higher than said low release force in the first adhesion zone to firmly adhere adjacent sheets 31 in the stack 30 together and thereby hold the stack 30 of sheets 31 together during handling, while affording continued peeling away of the sheet 31 in the stack 30 after initiating of such peeling along the first adhesion zone.

Figure 5:
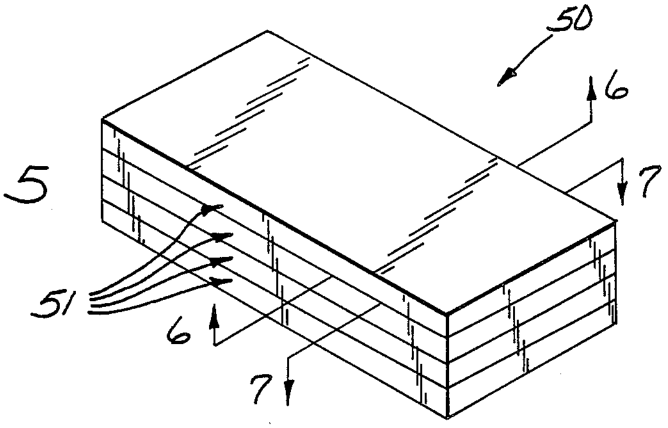
FIG. 5 is a perspective view of a third embodiment of a stack of sheets according to the present invention.
Figure 6:
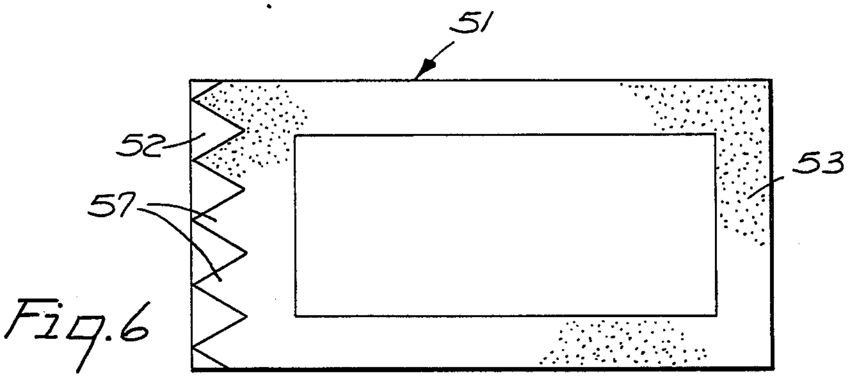
FIG. 6 is an enlarged sectional view taken approximately along line 6—6 of FIG. 5.
Figure 7:
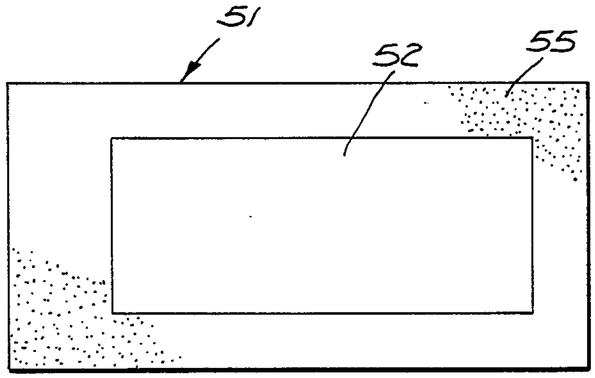
FIG. 7 is an enlarged sectional view taken approximately along line 7—7 of FIG. 5.

Referring now to FIGS. 5, 6 and 7 of the drawing, there is shown a third embodiment of a stack 50 of aligned sheets 51 according to the present invention, each of which sheets 51 includes a backing 52, a rectangular frame like coating 53 of pressure sensitive adhesive on a lower surface of the backing 52 by which the sheet 51 is adhered to the sheet 51 beneath it in the stack 50, which coating 53 extends along and within at least 12.5 mm of all of the edges of the backing 52, a printed image (not shown) on a top surface of the backing 52, and a coating 55 of a premium release low adhesion backsize along the top surface of the backing 52 over the printed image 54 in a pattern corresponding to that of the coating 53 of pressure sensitive adhesive. Release means, provided by the coating 53 of pressure sensitive adhesive on each sheet 51 having discontinuities defined by triangular portions 57 of the coating 53 projecting toward the edges of the sheet 51, provides a first adhesion zone between adjacent sheets 51 in the stack 50 and adjacent all of the edges of each sheet 51 for providing a sufficiently low release force (e.g., preferably less than 15 grams per inch) between the adhesive coating 53 and the upper surface of the adjacent sheet 51 in the stack 50 to afford, when the sheet 51 is the uppermost sheet 51 in the stack 50, easy initiation of peeling of the sheet 51 from the adjacent sheet 51 in the stack 50; and attachment means, provided by the coating 53 of pressure sensitive adhesive being continuous along the bases of the triangular portions 57, provides a second adhesion zone between adjacent sheets 51 in the stack 50 for providing a sufficiently high release force (e.g., preferably greater than 20 grams per inch) that is higher than said low release force in the first adhesion zone to firmly adhere adjacent sheets 51 in the stack 50 together and thereby hold the stack 50 of sheets 51 together during handling, while affording continued manual peeling away of the uppermost sheet 51 in the stack 50 after initiating of such peeling along the first adhesion zone.

EXAMPLES 1–5

One side of a paper liner backing was coated with a heat-curable silicone low adhesion backsize consisting of 100.0 parts by weight Syl-Off® 7044, commercially available from Dow Corning Corp., and 4.0 parts by weight Syl-Off® 7048, also commercially available from Dow Corning Corp. The low adhesion backsize was applied with a 120 ruling mill rotogravure knurl and cured at 375 degrees F. The opposite side of the backing was coated with pressure sensitive adhesive consisting of a 25% solids solution copolymer of 95% iso-octyl acrylate 5% acrylic acid, prepared as taught in U.S Pat. No. Re. 24,906, the content whereof is incorporated herein by reference. The pressure sensitive adhesive coating was applied using a flat, weighted coating bar, shimmed with various numbers of shims or layers of 2.0 mil thick tape along both edges to provide various wet coating thicknesses. The pressure sensitive adhesive coating was dried at 150 degrees F., and the coated backing was cut into individual sheets that were placed in stacks with the coating of pressure sensitive adhesive on each sheet adhering it to the low adhesion backsize coated surface of the sheet beneath it in the stack. The stacks were trimmed and release and adhesion force values were measured using the following test procedures.

Release force measurement: This test measured the force required to separate the pressure sensitive adhesive coating on one sheet from the low adhesion backsize coated surface of the underlying sheet in the stack. The release value is measured using a constant-rate-extension device. The bottom sheet of the stack is adhered to a platform on the constant-rate-extension device, after which one end of the top sheet in the stack is peeled off of the stack at 180 degrees by moving the platform at a speed of 229 cm/min in a direction parallel to the surfaces of the sheets in the stack. The average force required for removal of the uppermost sheet was recorded and is reported as the release force value of the sheet from the underlying sheet.

Adhesion force measurement: This test measured the separation force of the pressure sensitive adhesive coating on the sheets from a standard glass surface. A smooth glass plate was attached to the constant-rate-extension device platform. Strips of the sheets were laid with their pressure sensitive adhesive coated surfaces on the surface of the glass plate and laminated thereto with two passes of a 2.0 kg rubber roller. One end of each strip was then peeled off at 180 degrees by moving the platform at a speed of 25.4 cm/min in a direction parallel to the glass surface. The average force required for removal of the strips from the glass surface was recorded and is reported as the adhesion force value of the adhesive on the strips to the glass plate.

TABLE I

Comparative Examples

| Example No. | Number of Shims | Release Force Value (g/in) | Adhesion Force Value (oz/in) |
|---|---|---|---|
| 1 | 0 | 9.7 | 0.9 |
| 2 | 1 | 15.8 | 8.7 |
| 3 | 2 | 30.1 | 21.5 |
| 4 | 3 | 32.6 | 34.3 |
| 5 | 4 | 36.8 | 63.6 |

These tests demonstrated that while the release force value of a sheet from the stack could be controllably lowered by using thinner layers of pressure sensitive adhesive, adhesion of the removed sheet to a substrate was sacrificed. Sheets in the stack made in accordance with Example No. 2 were easily removed from the stack. Sheets in the stack made in accordance with Example No. 3 were quite difficult to remove from the stack. The stack of sheets of Example No. 1 fell apart with even gentle handling of the stack.

EXAMPLE 6

Sheets of the type described above with respect to FIGS. 1 and 2 of the drawing were made, with each sheet having on one surface a uniform coating of pressure sensitive adhesive, and on the other surface different portions coated with two different low adhesion backsize coatings having different release characteristics, and coated over color printing arranged so that the sheets were useful for labeling file folders. One of the low adhesion backsizes was organic, included polyvinyl N-octadecyl carbamate, and was prepared as taught in U.S. Pat. No. 2,532,011 incorporated herein by reference; whereas the other was the silicone low adhesion backsize described above in Examples 1 through 5. The organic low adhesion backsize was coated from a 5% solids solution on to a long web of tablet-grade preprinted paper backing across the full 15 cm of web. The web was dried at 150 degrees F. The silicone low adhesion backsize was coated using the coating bar described above for use in coating pressure sensitive adhesive with 1 shim at each end of the bar. The silicone low adhesion backsize was coated in stripes only over preprinted areas of the web intended for color-coding along the top of each sheet or each label to be made, and was cured at 225 degrees F.

A low peel pressure sensitive adhesive was prepared from a suspension in organic solvent of 20 parts of the copolymer of 95% iso-octyl acrylate and 5% acrylic acid plus 80 parts of tacky, elastomeric copolymer microspheres ranging in diameter from about 10 to 150 micrometers. The microspheres were made as taught in U.S. Pat. No. 3,961,140 incorporated herein by reference. The pressure sensitive adhesive dispersion was coated using the coating bar described above in Examples 1 through 5, using 2 shims at each end of the bar. The pressure sensitive adhesive was coated over the entire surface of the web opposite the low adhesion backsize coatings, and was dried at 150 degrees F. Subsequently, sheets were cut from the web, stacked in register to form stacks, and each stack was trimmed to provide sheets or labels 1.75 cm×9.0 cm in size with a 4.0 mm wide portion of each label along one edge coated with the silicone low adhesion backsize. The top sheet or label in each of the stacks was easily dispensed by initiating peel along the edge adjacent silicone low adhesion backsize coating. The adhesion force value for the pressure sensitive adhesive coating measured on the web using the constant-rate-extension device as described above was 3.4 ounces per inch. The release force value between the coating of pressure sensitive adhesive and the organic low adhesion backsize measured using the constant-rate-extension device as described above using a length of the web coated full width with the organic low adhesion backsize was 45.0 grams per inch. The release force value between the coating of pressure sensitive adhesive and the silicone low adhesion backsize measured using the constant-rate-extension device as described above using a length of the web first coated full width with the organic low adhesion backsize and then coated full width with the silicone low adhesion backsize was 0.1 grams per inch.

EXAMPLE 7

Sheets of the type described with reference to FIGS. 3 and 4 were made as follows. A preprinted clay-coated label stock paper backing was coated on one surface with a silicone low adhesion backsize consisting of 100.0 parts by weight Syl-Off® 7610 commercially available from Dow Corning Corp., and 4.0 parts by weight Syl-Off® 7611 also commercially available from Dow Corning Corp. The silicone low adhesion backsize was applied using offset gravure means with a 130 line pyramidal gravure cylinder and rubber coated transfer rollers, and was cured at 375 degrees F. for about 20 seconds.

The opposite surface of the backing was coated with an aggressive pressure sensitive adhesive commercially designated Duro-tak® 34-4142 and available from National Starch and Chemical Corp. to provide 3.8 cm×12.7 cm rectangles of the adhesive 35.6 micrometers thick, with 6.4 mm wide uncoated areas between the rectangles on all four sides. A second removable pressure sensitive adhesive consisting of a 10% solids solution of 95% iso-octyl acrylate and 5% acrylic acid was then coated over the entire surface of the backing on which the rectangles of the aggressive pressure sensitive adhesive were coated, with the resultant double coatings on the rectangles providing rectangles of permanent pressure sensitive adhesive. This second coating of removable pressure sensitive adhesive was applied with a number 8 Mayer rod and dried at 150 degrees F. Subsequently, sheets were cut from the backing, stacked in register to form stacks, and each stack was trimmed in such a way to provide sheets or labels each 4.4 cm by 13.3 cm in size with each sheet or label having a central portion coated with the permanent pressure sensitive adhesive, and with a frame of the removable pressure sensitive adhesive around the central portion and extending to the edges of the sheet. The top sheet or label in the stack was easily dispensed by initiating peel of the sheet from the stack along any edge.

The release and adhesion force values of the permanent and removable pressure sensitive coatings thus produced on the sheets were measured by coating each adhesive full width on different pieces of the paper backing, and testing 2.5 cm widths thereof for both adhesion to a glass surface and release from the paper backing coated with the silicone low adhesion backsize described in this example using the test procedures described above. The permanent pressure sensitive adhesive had an adhesion force value of 72.5 ounces per inch, and a release force value of 55.0 grams per inch, whereas the removable pressure sensitive adhesive had an adhesion force value of 0.7 ounces per inch, and a release force value of 8.9 grams per inch.

EXAMPLE 8

Sheets of the type described with reference to FIGS. 5, 6 and 7 were made as follows. A preprinted label stock paper backing was coated on one surface with the silicone low adhesion backsize described in Examples 1 through 5 using offset gravure means with a 150 line pyramidal gravure cylinder and rubber coated transfer rollers to provide an 1.5 cm wide frame of the silicone low adhesion backsize extending to the edges of a 6.5 cm×10.8 cm sheet with the central portion of the sheet left uncoated. The silicone low adhesion backsize was then cured at 375 degrees F.

The opposite sides of the sheets were coated with a 35.6 micrometers thick layer of the permanent pressure sensitive adhesive commercially available as Duro-tak® 34-4142 from National Starch and Chemical Corp. to provide a 1.3 cm wide pressure sensitive adhesive frame with an uncoated central portion and having one outer edge spaced from the edge of the sheet. Triangular projecting portions of the same pressure sensitive adhesive were added to the side of the pressure sensitive adhesive frame spaced from the edge of the sheet by first making a transfer tape by coating the pressure sensitive adhesive on the silicone coated side of a release liner, manually cutting the coated release liner in a saw-toothed pattern of consecutive isosceles right-triangles, each triangle having a 0.64 cm base, laminating the adhesive coated face of the release liner to the sheets such that the apices of the triangles extended 0.55 cm from the outermost edge of the pressure sensitive adhesive frame, and peeling the release liner away. the sheets were then stacked. Because the total width of pressure sensitive adhesive coating on the edges of the sheets at the apexes of the triangular projecting portions approached zero, the total release value (a measure of force per unit width of adhesive) also approached zero.

The sheets were found to dispense easily.

The present invention has now been described with reference to three embodiments thereof. It will be apparent to those skilled in the art that many changes can be made in the embodiments described without departing from the scope of the present invention. Thus the scope of the present invention should not be limited to the structures described in this application, but only by structures described by the language of the claims and the equivalents of those structures.

I claim:

1. A stack of aligned sheets, each of which sheets includes a backing having a plurality of edges providing a peripheral edge for the sheet, and upper and lower surfaces, a coating of pressure sensitive adhesive on said lower surface by which the sheet is adhered to the sheet beneath it in the stack, said coating extending along and within at least 12.5 mm of all of said edges, release means providing a first adhesion zone between adjacent sheets in the stack and adjacent one of said edges for providing a sufficiently low release force between said adhesive coating and the upper surface of the adjacent sheet in the stack to afford, when the sheet is the uppermost or lowermost sheet in the stack, easy initiation of peeling of the sheet from the adjacent sheet in the stack along the first adhesion zone, and attachment means providing a second adhesion zone between adjacent sheets in the stack for providing a sufficiently high release force that is higher than said low release force in the first adhesion zone to firmly adhere adjacent sheets in the stack together and thereby hold the stack of sheets together during handling, while affording continued peeling away of the sheet in the stack after initiating of such peeling along the first adhesion zone.

2. A stack of sheets according to claim 1 wherein said release means provides a release force value of less than about 15 grams per inch in said first adhesion zone, and said attachment means provides a release force value of greater than about 20 grams per inch in said second adhesion zone.

3. A stack of sheets according to claim 2 wherein said release means includes a coating of silicone low adhesion backsize along said upper surface in said first adhesion zone, and said layer of pressure sensitive adhesive is uniform, of the same adhesive composition, and has an adhesion to glass of less than 10 ounces per inch.

4. A stack of sheets according to claim 3 wherein said coating of pressure sensitive adhesive is a low peel pressure sensitive adhesive containing tacky elastomeric copolymer microspheres.

5. A stack of sheets according to claim 1 wherein said coating of pressure sensitive adhesive on each of said sheets is a uniform coating of the same pressure sensitive adhesive, and said release means includes a coating of low adhesion backsize coating on the portion of said upper surface of said sheet in said first adhesion zone.

6. A stack of sheets according to claim 1 wherein said coating of pressure sensitive adhesive is discontinuous on each of said sheets in said first adhesion zone to provide at least a portion of said release means.

7. A stack of sheets according to claim 1 wherein said coating of pressure sensitive adhesive has a different composition in said first and second adhesion zones to provide at least portions of said release and attachment means.

8. A stack of sheets according to claim 1 wherein said backing has zones of weakness formed therein.

9. A stack of sheets according to claim 1 wherein said backing has indicia printed on one of said surfaces.

10. A stack of sheets according to claim 1 wherein said coating of pressure sensitive adhesive extends along and within at least 6 mm of all of said edges.

11. A stack of sheets according to claim 1 wherein said coating of pressure sensitive adhesive comprises acrylic acid in one of said adhesion zones and comprises rubber resin in the other of said adhesion zones.

* * * * *